UNITED STATES PATENT OFFICE.

ELIAS A. SMITH AND MARKUS H. LYNG, OF ANACONDA, MONTANA, ASSIGNORS TO THE ILLINOIS REDUCTION COMPANY, OF CHICAGO, ILLINOIS.

METHOD OF EXTRACTING PRECIOUS METALS FROM ORES.

SPECIFICATION forming part of Letters Patent No. 649,962, dated May 22, 1900.

Application filed February 17, 1899. Serial No. 705,883. (No specimens.)

*To all whom it may concern:*

Be it known that we, ELIAS A. SMITH and MARKUS H. LYNG, residents of Anaconda, Deer Lodge county, State of Montana, have invented certain new and useful Improvements in Methods of Extracting Precious Metals from Ores, of which we do hereby declare the following to be a full, clear, and exact description.

The invention designs to recover gold and silver from either the free or the rebellious ores of these metals and is equally applicable whether copper in minor per centum be present or not. Should the copper exist in marked quantity, it may be first recovered by preliminary treatment of the ore in keeping with the method set out by our Patent No. 617,911, dated January 17, 1899. According to the improvement hereinafter described the given ore is subjected to a chlorination leaching, while suitable provision is made for the economic supply and for the subsequent regeneration of the chemicals employed under electrolytic action, whereby the chemicals are recovered to be used anew in dealing with additional batches of ore.

*Leach liquor.*—Before any digestion of the ore begins a supply of leach liquor or solvent should first be prepared. A solution of common salt, (NaCl,) composed of, *e. g.*, water, ninety per cent., and sodium chlorid, ten per cent., is rendered neutral or (for safety) slightly alkaline by addition of a suitable quantity of, *e. g.*, sodium hydrate (NaHO) or carbonate ($Na_2CO_3$) and is subjected thereupon to the familiar treatment now observed in bleaching paper-pulp by the electrolytic production of bleach liquid from common brine. As is well known, in such process the usual diaphragm generally interposed between the anodes and cathodes is discarded. For our purpose the treatment may be stopped with economic advantage after, *e. g.*, twenty to thirty per cent. of the feasible chlorin has become disrupted from its sodium compound. Under the neutral or slightly-alkaline condition prevailing in the electrolyte the released chlorin does not escape thence, but immediately reacts to form sodium oxychlorid, (NaOCl,) being retained as such by the solution to constitute the source of chlorin-supply for a later stage of the process. Besides the sodium oxychlorid the finished leach liquor obviously still contains a notable quantity of the original sodium chlorid, affording a solvent for silver chlorid if subsequently formed and also carries the minor percentage of alkaline addition used for standardizing the brine. The electrolytic changes which occur may be expressed by equation as follows:

(1) 6NaCl+elect.=
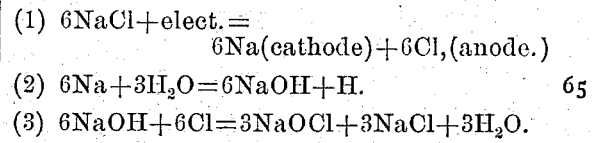

(2) $6Na + 3H_2O = 6NaOH + H$.

(3) $6NaOH + 6Cl = 3NaOCl + 3NaCl + 3H_2O$.

The leach liquor thus prepared is to be held in readiness for use during the next stage of treatment as occasion may require.

*Ore digestion.*—Three covered wood-lined tanks or barrels of the kind usual in lixiviating plants, each vessel capable of working, *e. g.*, five to ten tons of ore at a charge, may conveniently serve for the leaching outfit. The tanks carry internal stirrers, or if barrels be chosen these are kept rotating to hold the ore in suspension. Water containing a minor addition—*e. g.*, one to two per cent.—of free hydrochloric acid is admitted to the several vessels in volume sufficient to suspend the ore and to reduce the batch to the consistency of thin paste, this condition being best suited for effective reaction. In the presence of the free hydrochloric acid any lime or iron carbonates associated with the ore will pass over into soluble chlorids. Primarily, the hydrochloric acid is present as the agent preferred for release of nascent chlorin from the oxychlorid salt existing in the prepared leach liquor. The ore batch having attained the desired pasty consistency is next to be digested with a supply of the leach liquor already described. The quantity of such liquor admitted to the vat must vary, necessarily, in keeping with the ascertained per centum of metals constituting the ore values to be recovered. On contact with the free hydrochloric acid the sodium oxychlorid carried by the leach liquor reverts to the original sodium chlorid, which latter thus stands regenerated. Nascent chlorin is released by the reaction, and this in turn proceeds to attack the metals in the ore. Gold and copper chlorids thence resulting are soluble in water, while the silver chlorid (if any) is likewise soluble by virtue of the sodium chlorid present in the leach liquor. The digestion of the ore proceeds according to the leaching-in system, any given volume of liquid being caused to pass in turn through the several vessels of the series with intervals of detention at each, so that the liquid gradually becomes more and more charged with metallic salts in readiness to precipitate these from solution later on. While the observed scheme of leaching follows a definite system, the course is not in regular succession, but of a sinuous sort, the aim being to expose the ore most nearly spent to the action of the strongest leach liquid freshly drawn from the reserve supply.

To begin the operation, let the set of tanks be designated as A B C, respectively. A suitable volume of water having been run into tank A, together with the minor portion of free hydrochloric acid, an ore charge (denoted as $a$) is thereupon gradually admitted under constant stirring. When the batch assumes a homogeneous pasty consistency, a quantity of the leach liquid (designated by numeral 1) is let in. The reaction between the free acid and the oxychlorid salt at once begins, the liberated chlorin proceeding in turn to attack and dissolve the ore metals. Digestion progresses gradually. After liquid 1 has been held in tank A during, e. g., two hours it passes thence into tank B, containing ore charge $b$ with acidulated water and there remains, say, for two hours longer. The oxychlorid salt being in excess is subject to renewed attack by the fresh hydrochloric acid in tank B, while the released chlorin acts, as before, to unite with additional portions of the metals. The same reactions are repeated in tank C when liquid 1 from tank B reaches there to encounter ore charge $c$ and its acidulated suspension-water. Digestion at tank C may continue, e. g , two hours, and at the close of the period the liquid 1, "loaded" with soluble metallic chlorids, can be discharged thence into the precipitating-vats. Series tests taken at intervals will enable the operator to determine the progress of his work. Supplemental additions of hydrochloric acid and of leach liquid or of either of them may be made from time to time as seems requisite, and the duration of treatment at each tank can be varied to better insure the practical extraction of the metal values before final expulsion of the spent ore. In the table below the several supplies of liquid—viz., 1 2 3, &c.—and of ore—viz., $a$ $b$ $c$ $a'$ $b'$, &c.—charged into the respective tanks—viz., A B C—together with courses followed by the liquid at successive stages—viz., I II III, &c.—are indicated. The plant is in normal operation after Stage III, and it is seen that the direction taken by the liquid repeats itself thereafter at the close of each third stage.

| Stages of operation. | Tanks. | | |
|---|---|---|---|
| | A. | B. | C. |
| I | 1 $a$ | | |
| II | 2 $a$ | 1 $b$ | |
| III | 3 $a$ | 2 $b$ | 1 $c$ |
| IV | 2 $a'$ | 4 $b$ | 3 $c$ |
| V | 4 $a'$ | 3 $b'$ | 5 $c$ |
| VI | 6 $a'$ | 5 $b'$ | 4 $c'$ |
| VII | 5 $a^2$ | 7 $b'$ | 6 $c'$ |
| VIII | 7 $a^2$ | 6 $b^2$ | 8 $c'$ |
| IX | 9 $a^2$ | 8 $b^2$ | 7 $c^2$ |
| X | | | |

*Precipitating the solution.*—Aside from the sodium and base-metal chlorids it is seen that the chlorination treatment leaves in solution the chlorids of gold, silver, and copper. These latter metals can be recovered, e. g., according to either of the following plans:

I. By addition of scrap-copper to the solution the copper displaces gold and silver, throwing them down in metallic form and producing copper chlorid instead. The total copper chlorid present in solution can be next precipitated by aid of (a) scrap-iron, as well understood, the copper separating while iron chlorid remains. Again, the copper chlorid may be (b) converted to sulfid by digesting the solution with sulfhydric acid or by means of sodium sulfid, hyposulfite, or any other equivalent salt reacting to afford a supply of sulfhydric acid. The resultant copper sulfid which precipitates out may be dealt with later in familiar fashion to reclaim the copper in proper metallic condition.

II. The digested solution can be subjected to careful progressive precipitation of the gold and silver present, these metals being thrown down as insoluble sulfids by means of sulfhydric acid derived from some convenient source of supply—e. g., decomposition of iron matte. A set of series tests will instruct the operator touching the progress of the work and will enable him to arrest any further addition of the precipitating reagent when the gold and silver are gone, but before the copper chlorid (as yet unaffected) becomes materially involved. After the gold and silver sulfids are separated out from the solution an excess of sulfhydric acid may then be supplied to attack in turn the copper chlorid, which latter is thereupon converted into sulfid. The sulfid in its precipitated state becomes capable of easy isolation for recovery of the copper.

*Regenerating the waste.*—Having removed the gold, silver, and copper from the digested solution, it is seen that there yet remains sodium, iron, and calcium chlorids, with perhaps some free hydrochloric acid, unless, indeed, scrap-iron were used for throwing down the copper. Any such free acid first needs to be neutralized by addition of, e. g., caustic lime, caustic soda, or waste-iron. Ordinary limestone affords a cheap reagent. A quantity of the chlorid solution representing chemically the portion derived under reaction from the hydrochloric-acid additions is drawn off and evaporated until by fractional crystallization the total bulk of sodium chlorid can be taken out. The common salt thus obtained may later be redissolved and restored to the electrolyzer for further production of the desired supply of sodium oxychlorid. The crystals of sodium chlorid having been separated by reason of the superior solubility of iron and calcium chlorids, these latter salts are next evaporated to dryness and can then be heated on contact with sulfuric acid or with silica in presence of free steam in a suitable furnace to drive off the fumes of hydrochloric acid. The acid fumes are condensed and saved, while the lime and iron refuse left behind are discarded as waste. The iron and lime chlorids present in the "mother-liquor" after crystallizing out the sodium chlorid instead of being evaporated to dryness may be treated with sulfuric acid in familiar fashion to distil the fumes of hydrochloric acid, which are thereupon condensed and recovered. That portion of the chlorids solution withheld from treatment by fractional crystallization, as just detailed, can be treated in the electrolyzer after being rendered slightly alkaline and be there converted into sodium, calcium, and iron oxychlorids in readiness for reuse; but it is unnecessary to deal with any part of the chlorids solution by fractional crystallization. The total bulk can instead be run at once into the electrolyzer for production of the oxychlorid salts just named. The sodium oxychlorid thus derived by electrolytic treatment obviously becomes regenerated from the waste and can be employed as before in digesting further supplies of ore. The calcium and iron oxychlorids being insoluble are removed from the electrolytic bath to an additional set of digestion-tanks of the sort already described. Held in watery suspension under proper agitation the free hydrochloric acid present attacks such oxychlorids, causing them to yield fresh quantities of chlorin for further solution of the noble metals. After precipitation of the gold, silver, and copper chlorids thus derived the iron and calcium chlorid solution still remaining may be drawn off, evaporated to dryness, and the hydrochloric acid be later recovered by furnace treatment—e. g., with silica—as hereinbefore set forth. By the method proposed it is seen that the chlorin released from the oxychlorid under action of the free acid after effecting desired solution of the precious metals contained in the ore and separate precipitation of said metals is retained as chlorid in the remaining base solution and together with the associated alkaline chlorid can be recovered again from such base solution under proper procedure in condition for reuse by electrolyzing action, so as to form oxychlorid anew.

While the proportions, reagents, and mode of procedure hereinbefore set forth can be employed to advantage, it is obvious that variations from such details suggested by the knowledge of those skilled in the art may readily occur without essential departure from the invention. Thus in lieu of sodium chlorid it is feasible to use sodium bromid or iodid. Again, instead of soda salts there can be substituted the like salts of potash, lime, magnesia, iron, &c. From which range of equivalents it will at once appear that the term "alkali-metal" oxychlorid as used in the claims to follow is adopted merely in the way of succinct definition and not in limitation. The term includes the salts of the alkaline earths, iron, &c., equally with their equivalents—i. e., the salts of the alkali metals proper. Much depends upon local conditions in determining the choice of reagents. Sulfuric in place of hydrochloric acid might be taken. The regeneration would then change over to the fractional crystallization and separate recovery of sodium sulfate from excess sodium chlorid, the sulfate being a waste. The procedure is unchanged whether gold and silver or only one of them be present; nor does the minor content of copper compel any material variation. Should caustic soda rather than caustic lime be preferred as the agent for neutralizing the excess free acid, it is obvious that a small electrolyzer suited for the production of the requisite soda can easily be added to the plant. Because of the sluggish reaction it is practically immaterial whether the releasing acid be separately diluted or be directly admixed with a part of the brine or even with the oxychlorid solution before the leaching of the ore proceeds at the digestion-tanks.

Having thus described our invention, what we claim as new, and desire to secure by Letters Patent, is—

1. The method of extracting precious metal from ores which consists in forming a leach liquid with alkali-metal chlorid and oxychlorid admixed, digesting the pulverized ore suspended in such liquid in the presence of a free acid to release the chlorin and effect solution of the gold and silver (and copper, if present) precipitating said metals from the separated solution by addition of suitable reagent and, after removal of such resultant precipitates, thereupon neutralizing and electrolytically treating the residual solution so as to directly convert into oxychlorid the alkali-metal chlorid present in said solution and thus regenerate it for reuse, substantially as described.

2. The method of extracting precious metal from ores which consists in suitably electrolyzing an alkali-metal-chlorid solution to form in part oxychlorid leaving sodium chlorid in excess in the resultant leach liquid, digesting the pulverized ore in suspension with the mixed chlorid solution and a free acid to release the chlorin and effect solution of the gold and silver (and copper, if present) precipitating said metals from the separated solution by addition of suitable reagent and after removal of such resultant precipitates thereupon neutralizing and electrolytically treating the residual solution so as to directly convert into oxychlorid the alkali-metal chlorid present in said solution and thus regenerate it for reuse, substantially as described.

3. The method of extracting precious metal from ores which consists in suitably electrolyzing an alkali-metal-chlorid solution to form in part oxychlorid leaving sodium chlorid in excess in the resultant leach liquid, digesting the pulverized ore in suspension with the mixed chlorid solution and a free acid to release the chlorin and effect solution of the gold, silver, (and copper, if present,) properly precipitating said metals from the separated solution and after removal of such precipitates, evaporating the residual solution for recovery of the alkali-metal chlorid by fractional crystallization, dissolving the recovered chlorid crystals and thereupon treating the same electrolytically to regenerate the chlorid to the state of oxychlorid in readiness for reuse, substantially as described.

4. The method of extracting precious metal from ores which consists in suitably electrolyzing an alkali-metal-chlorid solution to form in part oxychlorid leaving sodium chlorid in excess in the resultant leach liquid, digesting the pulverized ore in suspension with the mixed chlorid solution and a free acid to release the chlorin and effect solution of the gold, silver, (and copper, if present,) properly precipitating said metals from the separated solution and after removal of such precipitates, partially evaporating the mixed chlorid solution remaining so as to separately recover by fractional crystallization the alkali-metal chlorid present, digesting by means of a suitable reagent (with aid of free steam if necessary) the concentrated mixed chlorids left over as a residue from such fractional crystallization, condensing the vapors of hydrochloric acid thence evolved, separately dissolving the recovered crystals of alkali-metal chlorid and thereupon treating such solution electrolytically to regenerate the same into state of oxychlorid for reuse, substantially as described.

ELIAS A. SMITH.
MARKUS H. LYNG.

Witnesses:
JOHN C. LALOR,
MARIE C. SMITH.